(12) United States Patent
Welles, II et al.

(10) Patent No.: US 6,577,353 B1
(45) Date of Patent: Jun. 10, 2003

(54) OPTIMIZATION OF TELEVISION RECEPTION BY SELECTING AMONG OR COMBINING MULTIPLE ANTENNA INPUTS

(75) Inventors: Kenneth Brakeley Welles, II, Scotia, NY (US); Mark Lewis Grabb, Burnt Hills, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/422,445

(22) Filed: Oct. 21, 1999

(51) Int. Cl.$^7$ .............................. H04N 5/00; H04N 5/44; H04N 5/46; H04B 17/00; H04B 17/02
(52) U.S. Cl. ................... 348/706; 348/731; 348/729; 348/705; 348/725; 455/134; 455/135; 455/136; 455/277.1; 455/277.2
(58) Field of Search ................... 348/731, 725, 348/706, 705, 729, 707, 614, 555, 570; 455/134, 135, 136, 277.1, 277.2, 137; 343/876

(56) References Cited

U.S. PATENT DOCUMENTS

| | | | |
|---|---|---|---|
| 3,681,695 A | * 8/1972 | Cease et al. ................ | 325/305 |
| 4,450,585 A | * 5/1984 | Bell ............................ | 455/135 |
| 5,159,707 A | * 10/1992 | Mogi et al. ................. | 455/134 |
| 5,303,396 A | * 4/1994 | Ooyagi et al. .............. | 455/134 |
| 5,313,660 A | * 5/1994 | Lindenmeier et al. ...... | 455/135 |
| 5,335,010 A | * 8/1994 | Lindemeier et al. ........ | 348/706 |
| 5,818,543 A | * 10/1998 | Lee ............................. | 348/725 |
| 5,844,632 A | * 12/1998 | Kishigami et al. .......... | 348/706 |
| 5,848,361 A | * 12/1998 | Edwards ..................... | 455/562 |
| 6,188,447 B1 | * 2/2001 | Rudolph et al. ............ | 348/729 |
| 6,304,299 B1 | * 10/2001 | Frey et al. .................. | 348/614 |

\* cited by examiner

*Primary Examiner*—John Miller
*Assistant Examiner*—Paulos Natnael
(74) *Attorney, Agent, or Firm*—John F. Thompson; Patrick K. Patnode

(57) ABSTRACT

In a system for optimizing television reception by a television receiver receiving a diversity of input signals from a plurality of antennas, one of a plurality of combiners and television tuners selects the strongest combination of input signals for viewing and another scans the various combinations of input signals searching for a combination significantly stronger than the combination being viewed. A plurality of multiplexers selects the output signal of one combiner and transmits the selected signal to one of the tuners. A signal evaluation module evaluates the strength of the combinations of input signals and compares the strength of each combination of input signals to the strength of the viewing signal, looking for a superior signal. A control processor controls the combination of input signals selected by the combiners and the combiner output signal selected by the multiplexers. The control processor converts any superior signal found into the signal being viewed, at which time the process starts over and repeats.

14 Claims, 4 Drawing Sheets

OPTIMIZATION OF TELEVISION RECEPTION BY SELECTING AMONG OR COMBINING MULTIPLE ANTENNA INPUTS

CROSS REFERENCE TO RELATED PATENT APPLICATION

This patent application is related in subject matter to U.S. patent application Ser. No. 09/201,376 filed Nov. 30, 1998, by M. L. Grabb, N. Al-Dhahir, R. L. Frey, J. E. Hershey, J. A. F. Ross, and N. A. VanStralen, for "System and Method for Mitigating Multipath Effects in Television Systems", which is assigned to the instant assignee. The disclosure of application Ser. No. 09/201,376 is incorporated herein by reference.

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital television (DTV) and, more particularly, to optimization of television reception by selecting among, or combining, input signals from multiple antennas for mitigation of multipath.

2. Background Art

High definition television (HDTV) is an emerging technology that is capable of providing service either in an analog or digital format. In the United States, research on HDTV has focused on digital, rather than analog, technology. While digital HDTV is not currently available, Japanese companies have developed an HDTV system based on analog technology (known as Hivision) that has been in use since 1991. Because of the potential advantages of digital HDTV and many technical problems shared by both types of systems, research in digital HDTV has also been active in Japan. See, for example, David K. Kahaner in "HDTV Research in Japan", *IEEE Micro*, October 1993, pp. 49–53.

One of the most important prevalent problems in digital television (DTV) is that of multipath. In fact, it is useful to think of the DTV channel as multipath limited and not power limited. Multipath may arise from fixed structures, such as building walls, acting as reflectors in the transmission channel. Moving objects, such as airplanes, may also cause a multipath condition. Even microreflections in cabling can cause multipath. See, for example, P. T. Marhiopoulos and M. Sablatash, "Design of a Ghost Canceling Reference Signal for Television Systems in North America", *Proceedings of Canadian Conference on Electrical and Computer Engineering*, Vancouver, BC, Canada, 14–17 September 1993, pp. 660–663.

The effect of multipath is to create "ghosts" in the displayed TV image. The statistics of multipath ghosts have been studied and compiled by, among others, the BTA (Japan's Broadcasting Technology Association). A BTA survey reported that 92% of ghosts are within a −4 to 26 $\mu$second range, and when extended to −4 to 37 $\mu$seconds, almost all occasions of ghost creation are covered.

An adaptive equalizer has been proposed to "undo" the effects of the multipath. In its crudest form, an adaptive equalizer can be thought of as a signal processor that estimates the parameters of a hypothetical filter that best describes the channel. The signal processor adjusts the taps of the adaptive equalization filter to approximate an inverse of the hypothetical filter, thus inverting or undoing the effects of the multipath.

The BTA, and other concerns, designed a "ghost canceling reference (GCR)" transmitted signal to mitigate these multipath induced effects. The BTA GCR was found to be less than satisfactory in some cases. While homes with outdoor antennas displayed non-varying (stationary) ghosting conditions which could be largely corrected, those homes with indoor antennas experienced changing (dynamic) ghosts. These ghosting conditions were more prevalent when people were moving about the room or other moving objects were in the signal path. The BTA ghost canceller generally was unable to adequately compensate for these conditions. In fact, false ghosts were actually added to an already ghosted picture, leading to reduced picture quality.

Thus, multipath behavior of the DTV channel is important for two different regimes, the outdoor antenna propagation channel and the indoor antenna propagation channel. The former is well-studied and understood. The latter regime still presents a problem. The chief difference is the presence of significant reflectors near the indoor receiving antenna, the presence of which implies that there will be multipath whose delay occasions it to fall within a symbol period. In order to resolve multipath differences of such limited extent, special techniques must be employed or the channel diagnostic signal must have a very wide effective bandwidth. According to S. Salous in "Indoor and Outdoor UHF Measurements with a 90 MHZ Bandwidth", *IEEE Colloquium on Propagation Characteristics and Related System Techniques for Beyond Line-of-Sight Radio*, 1997, pp. 8/1–8/6, the extent of multipath delays of outdoor environments can be a few tens of $\mu$seconds, whereas in indoor environments, it is on the order of a few hundred nanoseconds. While multipath components can be adequately resolved with a 10 to 40 MHZ bandwidth for outdoor environments, the resolution of multipath for indoor environments requires 90 to 100 MHZ bandwidth.

BRIEF SUMMARY OF THE INVENTION

In order to receive weak television signals in rapidly changing mutlipath interference environments, such as encountered in a house which does not have an external (outdoor) television antenna, a plurality of indoor antennas are attached to a television receiver. These indoor antennas are located, constructed or oriented in a manner to provide a diversity of input signals to the television receiver. This diversity is such that if one antenna, or a particular combination of more than one antenna, does not provide an acceptable television signal, then another antenna, or a different combination of more than one antenna, may provide an acceptable television signal. In a preferred embodiment, the television receiver is provided with more than one television tuner, so that, while one tuner is receiving the signal being viewed from one antenna or a particular combination of more than one antenna, the second tuner scans the signals from all other antennas and other combinations of antennas. The second tuner assigns a quality measure to each of these signals. When the quality measure of the signal producing the viewed image is significantly inferior to some other input signal combination, as happens when the signal multipath interference environment changes due, for example to people moving about in the television viewing room, the television receiver changes the input signal for viewing to whatever other antenna, or particular combination of antennas, has the highest quality measure.

DETAILED DESCRIPTION OF THE INVENTION

Figure 1:
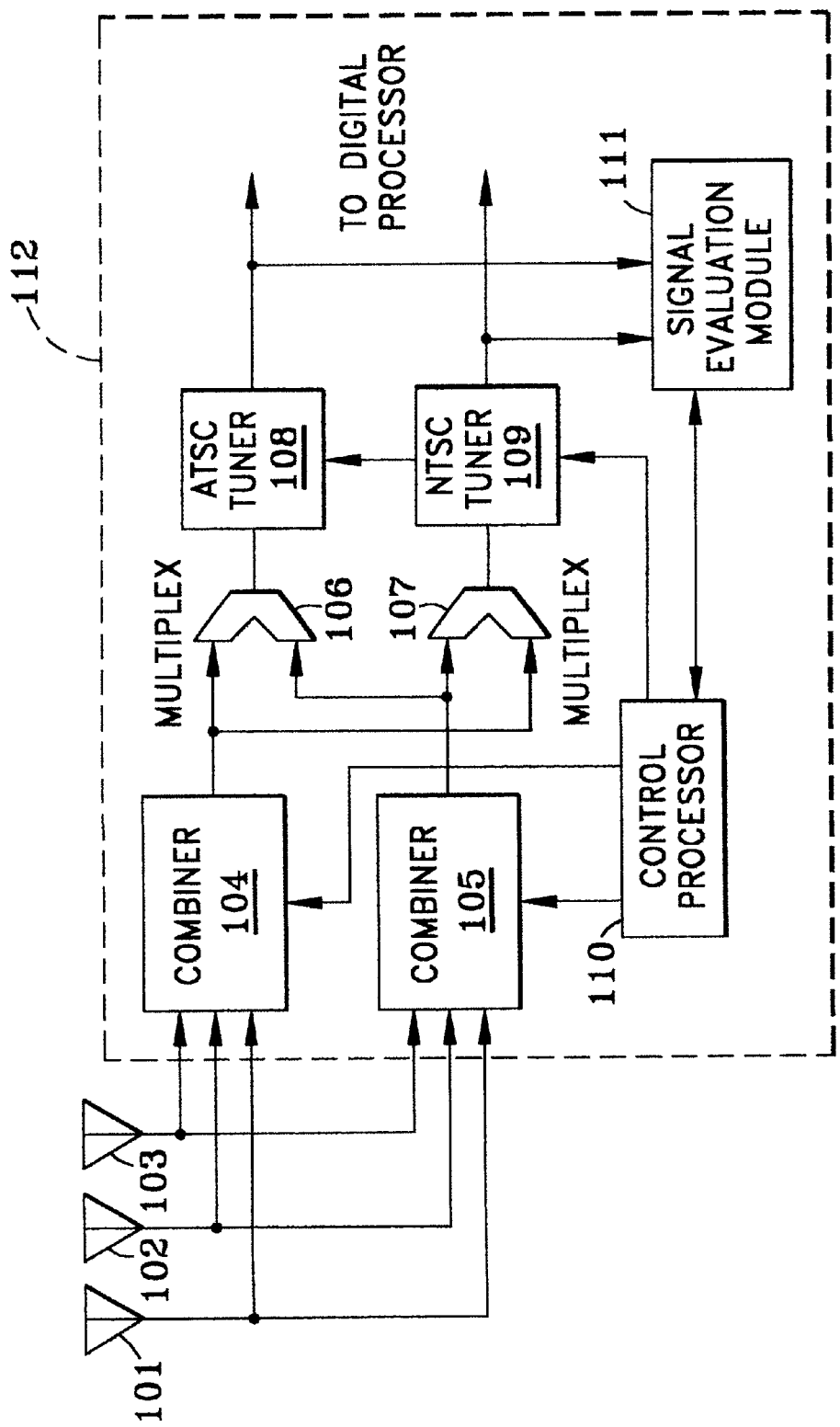
FIG. 1 is a block diagram of one embodiment of the invention.

FIG. 1 shows one embodiment of the invention wherein three antennas 101, 102 and 103 are attached to the front end of a television receiver 112. These antennas may be dipoles embedded in the mechanical structure of the television receiver, or external devices such as "rabbit ear" antennas placed in convenient locations and/or orientations in the vicinity of the television receiver. Each antenna is coupled to two signal combiners 104 and 105, the output signals of which are selected by multiplexers 106 and 107 as input signals to a respective one of ATSC (Advanced Television Standards Committee) tuner 108 and NTSC (National Television Standards Committee) tuner 109. ATSC tuner 108 is required for processing DTV signals, while NTSC tuner 109 is used to process conventional analog television signals.

Most digital television (DTV) receivers will have one NTSC tuner and one ATSC tuner, since there will be a transition period during which both analog and digital program material will be transmitted. During reception, only one tuner is in use decoding the program, the tuner being used corresponding to whether the channel being viewed is digital or analog. This invention makes use of the fact that there are two tuners in the television receiver. It will be understood by those skilled in the art, however, that the two tuners may be of the same type, e.g., both ATSC tuners, if the receiver is designed to receive only one type of transmission, e.g., DTV signals.

Each of combiners 104 and 105, multiplexers 106 and 107 and tuners 108 and 109 are controlled by a control processor 110. The control processor configures combiners 104 and 105 based on evaluations of the output signals of tuners 108 and 109 made by a signal evaluation module 111. Depending on the signal evaluation from module 111, multiplexers 106 and 107 are controlled to send the output signal of either combiner 104 or combiner 105 to ATSC tuner 108 or, correspondingly, the output signal of either combiner 104 or combiner 105 to NTSC tuner 109.

Figure 2:
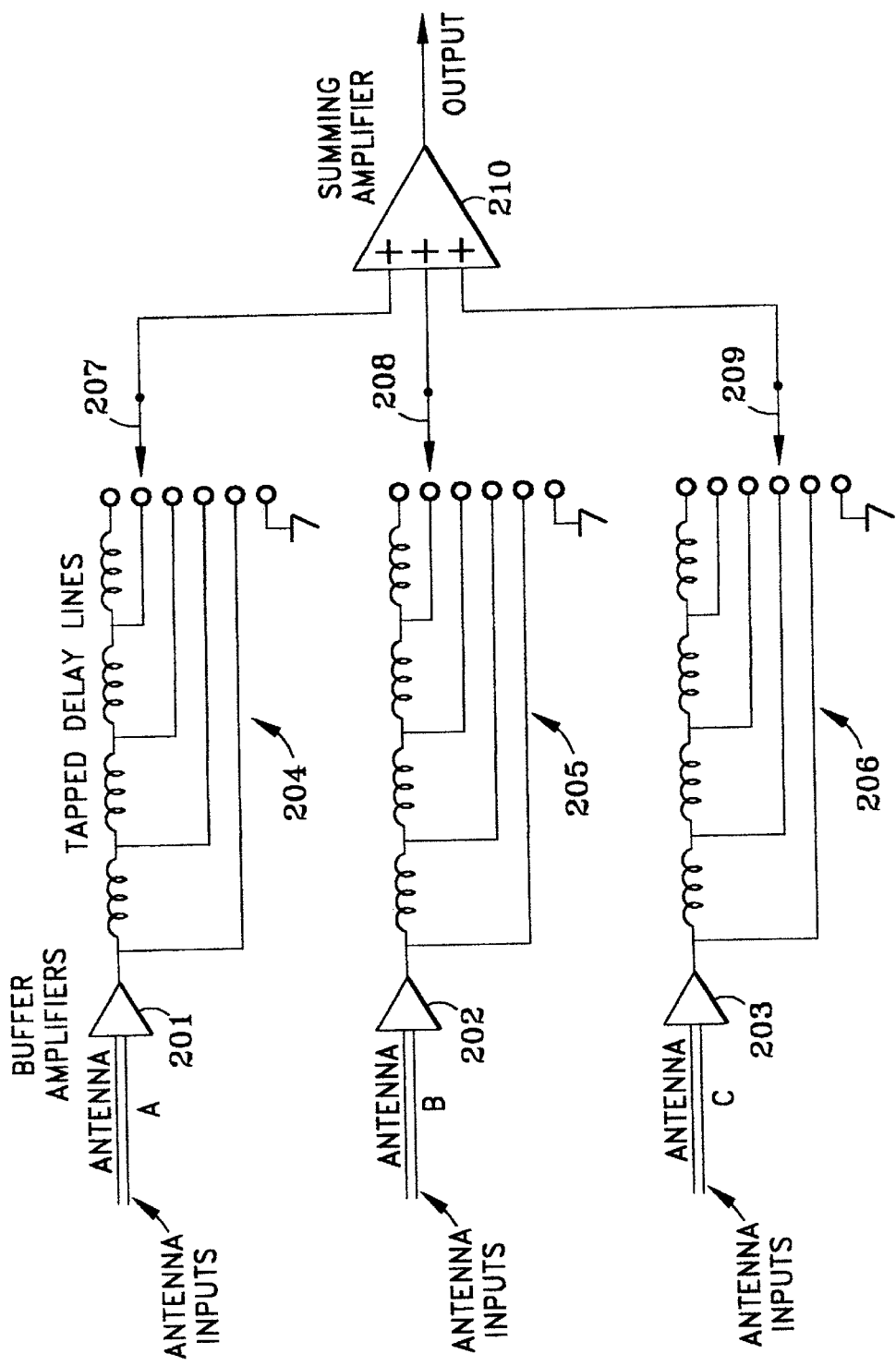
FIG. 2 is a schematic diagram showing one implementation of the combiner used in the embodiment of FIG. 1.

FIG. 2 shows an implementation of a combiner unit wherein the signal from each antenna connection thereto passes through a wideband buffer amplifier 201, 202 and 203, respectively. These wideband amplifiers isolate the incoming signal from the corresponding antenna so that no processing of the signal done by the combiner will be reflected back into the antenna to generate possible interference with the other combiner. The antenna signals from buffer amplifiers 201, 202 and 203 are passed through respective tapped delay lines 204, 205 and 206. Switches 207, 208 and 209 at the outputs of respective delay lines 204, 205 and 206 select among one of the delayed signals from the antenna, or the ground connection (no signal). Switches 207, 208 and 209 are connected to the inputs of a summing amplifier 210, which provides an output signal to each of the two multiplexers 106 and 107, shown in FIG. 1.

Another method of implementing variable delay is to use a continuously variable delay circuit where the amount of delay is selected by controlling voltage instead of using discrete switched steps. External control of the switches or control voltages allows the output signal of the summing amplifier to be the sum of the antenna signals with independently varied delays.

Figure 3:
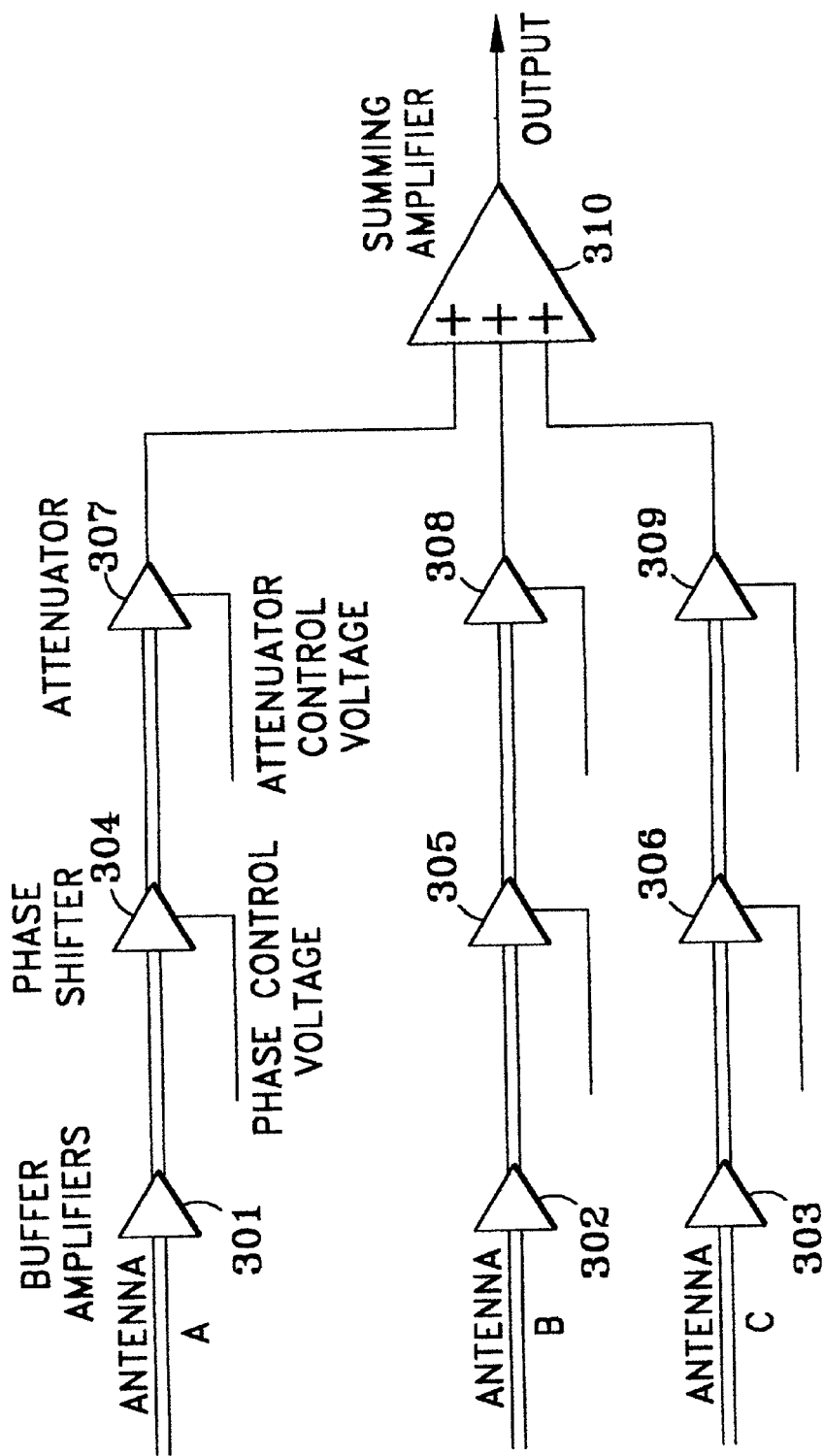
FIG. 3 is a block diagram showing an alternative implementation of the combiner used in the embodiment of FIG. 1.

FIG. 3 shows another implementation of the combiner. As in the FIG. 2 implementation, each antenna is connected to the combining unit through a wideband buffer amplifier 301, 302 and 303, respectively, which isolates the incoming signal from the corresponding antenna for the same reason as in the FIG. 2 implementation. In place of the tapped delay lines, however, the antennas are coupled to respective variable phase shifters 304, 305 and 306 which, in turn, are coupled to respective attenuators 307, 308 and 309. Each of the phase shifters and attenuators can be varied continuously with a control voltage, as shown, or in discrete steps with switches. External control of the switches or control voltages allows the output signal of a summing amplifier 310 to be the sum of the antenna signals with independently varied phases. Providing a phase shift of 180° allows summing amplifier 310 to perform a subtraction of signals, resulting in an output signal proportional to the difference between two antenna signals.

In both implementations shown in FIGS. 2 and 3, the combiner circuit can be configured to produce an output signal that is a summation of the different antenna signals with independently determined amounts of delay and phase shift, or with no contribution at all from one or more antennas. This makes possible the implementation of various diversity algorithms by the control processor 110 shown in FIG. 1. Spatial diversity combining is well known in the art for providing enhanced results in many difficult signal reception environments, such as rapidly changing multipath interference environments previously mentioned. Traditional methods of achieving enhanced reception comprise minimization of mean square error such as described in "Optimum Diversity Combining and Equalization to Digital Data Transmission with Applications to Cellular Mobile Radio—Part I: Theoretical Considerations" by P. Balaban and J. Salz, *IEEE Transactions on Communications*, Vol. 40, No. 5, pp. 885–894, May 1992. More recent work entails such techniques as blind maximum likelihood sequence estimation and its variants such as described in "Blind MLSE with Spatial Diversity Combining and Its Simplified Algorithm" by X. Biao and D. Min, *International Conference on Communication Technology*, pp. S47-05-1 to SA47-05-5, 1998.

In operation, a television receiver with multiple indoor antennas, viewed in a house where movement of persons inside the house, or other environmental changes inside or outside the house, causes the multipath signal environments for all of the TV channels to change with time. This television receiver is provided with the circuitry shown in FIG. 1, having two tuners which may be two NTSC tuners, two ATSC tuners, or one NTSC tuner and one ATSC tuner, the latter being typical of DTV receivers capable of receiving both analog and digital programs. The channel being observed is received by one of these tuners receiving a signal from either combiner 104 or 105, depending on the selection by multiplexers 106 and 107.

When combiner 104 is providing, via multiplexer 106, a signal to ATSC tuner 108, which is the signal being viewed, control processor 110 uses a signal evaluation module 111 to measure the strength and quality of the signal coming from ATSC tuner 108 (the signal being viewed), and configures multiplexer 107 so that the signal from combiner 105 is sent to NTSC tuner 109. Control processor 110 also configures the circuitry of combiner 105 in any one way, for example, with antenna 101 coupled to the summing amplifier (210 in FIG. 2 or 310 in FIG. 3) with no delay or phase shift, and no input signal (i.e., switches, 208 and 209 in FIG. 2 set to ground) from antennas 102 and 103. Control processor 110 then uses signal evaluation module 111 to measure the strength and quality of the signal produced by the summing amplifier. If this measurement is significantly higher (e.g., 1 dB) than the measurement made from the output of ATSC tuner 108, multiplexer 106 is reconfigured by control processor 110 so that ATSC tuner 108 now receives the signal from combiner 105.

If the strength and quality measurement of the NTSC output signal is not significantly greater than that for the ATSC output signal, then control processor 110 configures combiner 105 in a different manner. Processor 110 continues to try different configurations for combiner 105 until a superior signal is found. If and when a superior signal is found, processor 110 causes multiplexer 106 to send the superior signal to ATSC tuner 108. When this happens, processor 110 changes multiplexer 107 to evaluate the output signal of combiner 104. Processor 110 configures combiner 104 and evaluates different signal combinations therein in a manner similar to that previously described.

There are many possible methods by which processor 110 can cycle through the various combinations. One way is simply to exhaust all possible discrete settings. Another, and generally faster, way is to vary one parameter at a time to see if it leads to an increase in measured signal strength. If it does, that value of the parameter is adopted as the new setting. If it does not, another parameter is varied. If no single parameter results in an improvement, then two parameters are varied at a time, and so on. This type of sequential refinement is commonly known in the art as "hill climbing".

Periodically, processor 110 uses signal evaluation module 111 to re-evaluate the output signal of ATSC tuner 108 to update the quality measurement which may have changed since it was last examined. When this is done, the new value is used for evaluation as described above. Whenever the channel is changed by the viewer, the process begins again.

There are many possible metrics to use to evaluate signal strength and quality, and any of these may be used in this invention. One metric is the strength of the incoming signal, as indicated by an automatic gain control (AGC) signal that is present in the ATSC and NTSC tuners. Another metric is the flatness of a power spectrum measurement of the signal over the 6 MHz channel bandwidth.

In an alternative embodiment, the combiner circuitry may be intelligently driven by a wideband signal overlay correlator. Such a wideband signal overlay correlator is disclosed in copending application Ser. No. 09/201,376, cited above. This alternative embodiment is illustrated in FIG. 4.

Figure 4:
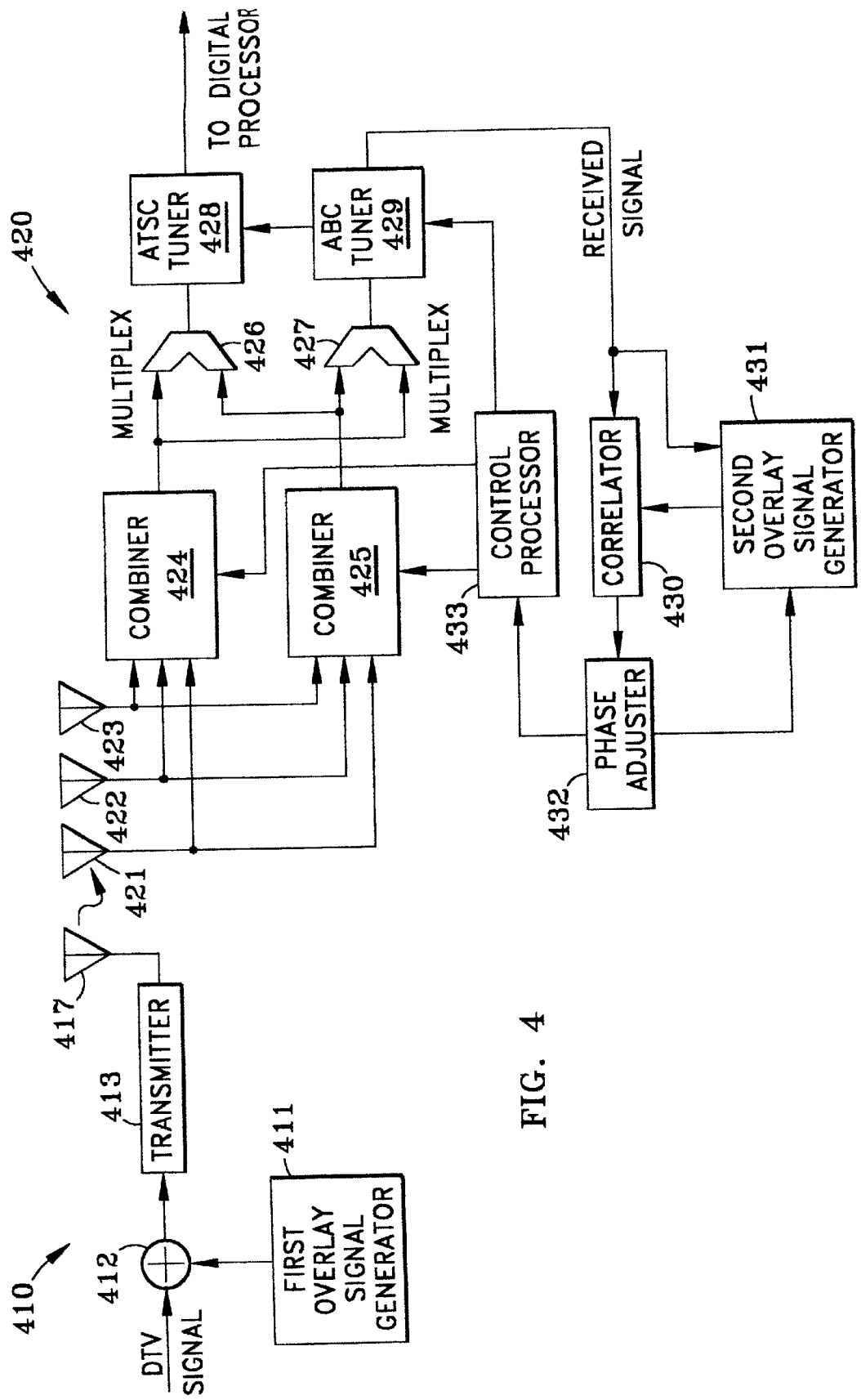
FIG. 4 is a block diagram of an alternative embodiment of the invention.

The system of FIG. 4 comprises a transmitter subsystem 410 and receiver subsystem 420. The transmitter subsystem includes a first overlay signal generator 411, an adder 412 and a transmitter 413. A digital television signal to be transmitted is provided to adder 412. Also provided to adder 412 is a first overlay signal generated by a first overlay signal generator 411. Adder 412 combines the first overlay signal and the digital television signal to provide a combined signal to transmitter 413 for transmission via a transmitting antenna 417. Receiver subsystem 420 includes receiving antennas 421, 422 and 423, combiners 424 and 425, multiplexers 426 and 427, ATSC tuners 428 and 429, a correlator 430, second overlay signal generator 431, phase adjuster 432, and control processor 433.

At the transmitter subsystem, the first overlay signal is a wide band, relatively low power random signal, having an autocorrelation property that produces periodic correlation peaks but a low cross-correlation property with the digital television signal. In one embodiment, overlay signal generator 411 is a sequence generator which produces an m-sequence as described in *Data Transportation and Protection* by John E. Hershey and R. K. Rao Yarlagadda, Chapter 8, pp. 273–308, Plenum Press, 1986.

The combined signal transmitted by transmitter 413 is received by antennas 421, 422 and 423 and supplied to combiners 424 and 425, in a manner similar to the FIG. 1 embodiment. The output signal of one of the combiners is selected by multiplexer 426 and supplied to tuner 428 and the output signal of the other combiner is selected by multiplexer 427 and supplied to tuner 429, which produces a demodulated signal at an intermediate frequency (IF). The IF signal is supplied to correlator 430 and to second overlay signal generator 431. The output signal of correlator 430 is supplied to phase adjuster 432 which provides a phase control feedback signal to second overlay signal generator 431. The output signal of phase adjuster 432 is also provided to processor 433 which generates control signals for combiners 424 and 425 and multiplexers 426 and 427.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. An apparatus for optimizing television reception in a television receiver comprising:

a plurality of antennas for providing signal inputs to the television receiver;

first and second signal combiners comprising first and second selecting devices, respectively, for selecting between respective ones of the signal inputs and combinations of the signal inputs wherein said first and second signal combiners are both connected to each of the plurality of antennas to receive the signal inputs;

first and second tuners respectively connected to the first and second signal combiners for receiving, respectively, a viewing signal and a scanned signal;

first and second multiplexers respectively coupled between said first and second combiners and the first and second tuners, the first multiplexer for selecting said viewing signal for said first tuner from output signals of said first selecting device and said second multiplexer for selecting said scanned signal for second tuner from output signals of said second selecting device, wherein said second selecting device is adapted to scan through output signals of said second combiner while said viewing signal has been selected by said first multiplexer;

a signal evaluation module coupled to receive said output signals of the first and second tuners for evaluating strength of the viewing signal and the scanned signal, wherein said signal evaluation module is adapted to evaluate said outputs signals provided by the second combiner while said first multiplexer has selected said viewing signal from said first tuner; and a control processor coupled to an output of the signal evaluation module for controlling the combination of signal inputs selected by the combiners and the combiner output signals selected by the multiplexers to route a superior signal to the first tuner.

2. The apparatus for optimizing television reception recited in claim 1, wherein the first and second combiners each comprise:
   a plurality of buffer amplifiers respectively connected to receive signals from corresponding ones of the plurality of antennas;
   a plurality of variable delay lines respectively coupled to outputs of corresponding ones of the buffer amplifiers; and
   a summing amplifier connected to receive output signals of the plurality of variable delay lines.

3. The apparatus for optimizing television reception recited in claim 2, wherein each of the variable delay lines comprises:
   a tapped delay line having a plurality of taps corresponding to different delays; and
   a switch for selecting one of the plurality of taps.

4. The apparatus for optimizing television reception recited in claim 3, wherein one of the plurality of taps is connected to ground.

5. The apparatus for optimizing television reception recited in claim 1, wherein the first and second combiners each comprise:
   a plurality of buffer amplifiers respectively connected to receive signals from corresponding ones of the plurality of antennas;
   a plurality of electronically controlled variable phase shifters respectively coupled to outputs of corresponding ones of the buffer amplifiers;
   a plurality of electronically controlled variable attenuators respectively coupled to outputs of corresponding ones of the variable phase shifters; and
   a summing amplifier connected to receive output signals of the plurality of variable attenuators.

6. A method for optimizing television reception, comprising the steps of:
   receiving a plurality of television input signals;
   selecting a first viewing signal from said plurality of television input signals;
   routing the first viewing signal to a first television tuner;
   combining the plurality of television signals in predetermined ones of all possible combinations to produce a composite signal for testing to determine which of the possible combinations of signals is the strongest signal while said first viewing signal is routed to said first television tuner;
   switching via a switching device through the input signals and combinations of input signals of a second television tuner not being viewed and comparing the strength of the input signals and combinations of input signals being scanned to the strength of the input signal or combination of input signals for viewing;
   determining when a scanned input signal or combination of input signals is stronger than the input signal or combination of input signals for viewing while said first viewing signal is routed to said first television tuner;
   selecting via a multiplexer the stronger input signal or combination of input signals as a second viewing signal; and
   routing the second viewing signal to the television tuner in place of the first viewing signal to said first television tuner.

7. The method for optimizing television reception recited in claim 6, further comprising the step of adjusting phase of each of the plurality of television signals prior to combining the plurality of television signals to produce the composite signal.

8. The method for optimizing television reception recited in claim 7, further comprising the step of adjusting amplitude of each of the plurality of television signals prior to combining the plurality of television signals to produce the composite signal.

9. An apparatus for optimizing television reception in a television receiver for receiving a television signal with a wideband overlay signal, comprising:
   a plurality of antennas for providing input signals to the television receiver;
   first and second combiners comprising first and second selecting devices, respectively, for selecting between respective ones of the signal inputs and combinations of said input signals inputs wherein said first and second signal combiners are both connected to each of the plurality of antennas to receive the signal inputs;
   first and second tuners respectively connected to the first and second signal combiners for receiving, respectively, a viewing signal and a scanned signal;
   first and second multiplexers respectively coupled between said first and second combiners and the first and second tuners, the first multiplexer for selecting said viewing signal for said first tuner from output signals of said first selecting device and said second multiplexer for selecting said scanned signal for second tuner from output signals of said second selecting device, wherein said second selecting device is adapted to scan through output signals of said second combiner while said viewing signal has been selected by said first multiplexer, said second tuner being adapted to produce an IF output signal;
   a correlator for receiving said IF output signal and generating an output signal with periodic correlation peaks; and
   a control processor for receiving the output signal of the correlator and controlling the combination of input signals selected by the combiners and the signals selected by the multiplexers to route a superior signal to the first tuner.

10. The apparatus for optimizing television reception recited in claim 9, wherein the first and second combiners each comprise:
    a plurality of buffer amplifiers respectively coupled to receive signals from corresponding ones of the plurality of antennas;
    a plurality of variable delay lines respectively coupled to outputs of corresponding ones of the buffer amplifiers; and
    a summing amplifier connected to receive output signals of the plurality of variable delay lines.

11. The apparatus for optimizing television reception recited in claim 10, wherein each of the variable delay lines comprises:
    a tapped delay line having a plurality of taps corresponding to different delays; and
    a switch for selecting one of the plurality of taps.

12. The apparatus for optimizing television reception recited in claim 11, wherein one of the plurality of taps is connected to ground.

13. The apparatus for optimizing television reception recited in claim 9, wherein the first and second combiners each comprises:

a plurality of buffer amplifiers respectively connected to receive signals from corresponding ones of the plurality of antennas;

a plurality of electronically controlled variable phase shifters respectively coupled to outputs of corresponding ones of the buffer amplifiers;

a plurality of electronically controlled variable attenuators respectively coupled to outputs of corresponding ones of the variable phase shifters; and a summing amplifier connected to receive output signals of the plurality of variable attenuators.

14. A method for optimizing television reception, comprising the steps of:

receiving a plurality of television input signals;

selecting a first television viewing signal from said plurality of television input signals;

routing the first television viewing signal to a first television tuner;

combining the plurality of television signals in predetermined ones of all possible combinations to produce a composite signal for testing to determine which of the possible combinations of signals is the strongest signal;

switching via a switching device through the input signals and combinations of input signals of a second television tuner not being viewed and comparing the strength of the input signals and combinations of input signals being scanned to the strength of the input signal or combination of input signals for viewing while said first television viewing signal is routed to said first television tuner;

determining when a scanned input signal or combination of input signals is stronger than the input signal or combination of input signals for viewing while said first viewing signal is routed to said first television tuner;

selecting via a multiplexer the stronger input signal or combination of input signals as a second television viewing signal; and routing said second television viewing signal to said first television tuner in place of the first television viewing signal.

* * * * *